Sept. 28, 1965 D. R. YOUNG 3,209,172

CRYOGENIC CURRENT REGULATING CIRCUIT

Filed Dec. 31, 1962 2 Sheets-Sheet 1

INVENTOR
DONALD R. YOUNG

BY S. P. Tedesco
ATTORNEY

United States Patent Office 3,209,172
Patented Sept. 28, 1965

3,209,172
CRYOGENIC CURRENT REGULATING CIRCUIT

Donald R. Young, Poughkeepsie, N.Y., assignor to International Business Machines Corporation, New York, N.Y., a corporation of New York Filed Dec. 31, 1962, Ser. No. 248,782
19 Claims. (Cl. 307—88.5)

This invention relates to cryogenic devices and, more particularly, to an arrangement for regulating biasing currents supplied to a cryogenic array.

Superconductivity is that property of certain materials to exhibit no electrical resistance when maintained below a critical transition temperature $T_c$. The critical transition temperatures of materials known to exhibit superconductivity range between 0.1° K. to 17° K.; at the critical transition temperature, and disregarding slight hysteretic effects, transition between normal resistive and superconductive phase states of a good specimen is very nearly discontinuous. While the specimen is maintained below its critical transition temperature $T_c$, superconductivity can be destroyed by sufficiently large magnetic fields or by a sufficiently large applied current. The magnitude of the external or critical magnetic fields $H_c$ and also the critical self-current necessary to destroy superconductivity along a specimen decreases with increasing temperature and reduces to zero at the critical transition temperature $T_c$.

Most recently, cryotron devices have been formed of thin conductor strips of films of hard and soft superconductive material, respectively, deposited in laminar fashion and in magnetic field-applying relationship onto a planar substrate. When properly refrigerated, switching magnetic fields $H_w$ generated by current flow along the hard superconductive strip, i.e. the control conductor, exceed the critical magnetic fields $H_c$ of the soft superconductive strip, i.e. the gate conductor, and switch the latter to a resistive state. Since the gate conductor can define two distinct and stable states, cryotron devices can be used in computer applications as unique electrical switches to define binary quantities and perform logic.

Basically, the operation of cryogenic arrays, as hereinafter described, is based upon selective current switching between parallel superconductive paths defining a superconductive loop and each including as a segment the gate conductor of a cryotron device. When a gate conductor in one superconductive path is driven resistive momentarily, the entire current is forced to flow into the other path; once switched, the current continues to flow entirely along the other superconductive path due to inductance of the superconductive loop. The speed at which current can be switched in a superconductive loop is expressed by the inductive time constant $L/R$ where, L is the loop inductance and R is the normal resistance of the gate conductor introduced along the one superconductive path. The electromagnetic time constants of the superconductive loop can, in principle, be greatly reduced through special cryotron design. A second limitation on the speed at which current can be switched in a superconductive loop is due to variations in operating temperatures. Although the phase transition is very nearly discontinuous, currents along a gate conductor when switched resistive decay nearly exponentially due to loop inductances, the energy stored in the magnetic field being dissipated ohmically. Also, a small quantity of ohmic heat is generated by eddy currents induced while magnetic fields are applied to a normal gate conductor. Ohmic heat thus generated tends to increase operating temperatures of the array and vary the switching characteristics of the individual cryotron devices.

The switching speeds of cryotron devices can be increased when biasing techniques are employed. To this end, an additional conductor of hard superconductive material, i.e. a bias conductor, is registered with the control conductor; a constant current $I_b$ directed along the bias conductor applies a constant magnetic biasing field $H_b$ to the gate conductor. The total magnetic field $H_{0d}$ applied to the gate conductor, i.e. $H_w+H_b$, are in excess of the critical magnetic fields $H_c$ at a particular operating temperature $T_0$. The overdriving magnetic fields $H_{0d}$ overcome latent heat effects and accelerate the phase transition of the gate conductor to the resistive phase state.

In addition, cryotron devices arranged in an array must exhibit a greater-than-unity current gain. The current gain of a cryotron device is usually expressed as $I_{g0}/I_{c0}$, where $I_{0g}$ is the critical self-current of the gate conductor and $I_{c0}$ is current along the control conductor required to drive the gate conductor resistive at the operating temperature $T_0$ and in the absence of gate conductor current. Greater-than-unity gain is necessary since gate conductor current in one cryotron device is very often control conductor current in another cryotron device. With respect to "cross-over" cryotrons, greater-than-unity gain is achieved by reducing the width of the control conductor with respect to that of the gate conductor, for example, as shown and described in the co-pending patent application of Richard L. Garwin, Serial No. 625,512, which was filed on November 30, 1956 and assigned to a common assignee. This geometry is effective to reduce the critical current $I_{c0}$ of the control conductor to a value less than the critical self-current $I_{g0}$ of the gate conductor. The resistance introduced when the gate conductor is switched, however, is limited to that portion of the gate conductor actually traversed by the control conductor. With respect to "in-line" cryotrons, however, a larger resistance is introduced when the gate conductor is switched because of the parallel arrangement of the gate and control conductors. Due to its particular geometry, the "in-line" cryotron is inherently a less-than-unity gain device; a greater-than-unity gain "in-line" cryotron can be achieved, however, with biasing techniques, for example, as taught in the Charles J. Bertuch et al. Patent 3,145,310, which was filed on August 23, 1961 and assigned to a common assignee.

Therefore, bias techniques in cryogenic applications (1) supplement switching magnetic fields $H_w$ in providing over-driving magnetic fields $H_{0d}$ which reduce the transition time of a gate conductor between superconductive and resistive phase states; (2) adapt "in-line" cryotron devices for greater-than-unity gain operations; and, (3) lessen the magnitude of working currents $I_w$, i.e. gate and control conductor currents, whereby ohmic heating generated during dynamic operation of a cryogenic array is reduced.

Heretofore, biasing currents $I_b$ of fixed magnitude dependent upon design considerations have been supplied to cryogenic arrays. Cryotron devices, however, are extremely temperature-sensitive; variations in the order of 0.001° Kelvin can have a significant effect on the switching characteristics of a cryotron device. It is conceivable that operating temperatures can vary sufficiently during dynamic operation of a cryogenic array such that, if continuous biasing currents $I_b$ are supplied, malfunction can result.

An object of this invention is to regulate operating currents, e.g. biasing current $I_b$, supplied to a cryogenic array as a function of operating temperature.

Another object of this invention is to compensate the operation of a cryogenic array in accordance with variations in operating temperatures.

Another object of this invention is to control the magnitude of operating currents, e.g. biasing currents $I_b$, supplied to a cryogenic array with increasing or decreasing operating temperatures.

Another object of this invention is to provide a regulating element formed of similar materials and during the same fabrication process as the device to be regulated whereby materials in each exhibit identical characteristics and proper compensation to said devices fabricated by separate processes is insured.

These and numerous other objects and advantages of this invention are achieved in accordance with one aspect of this invention by directing operating currents, e.g. biasing currents $I_b$, supplied to a cryogenic array to flow as gate conductor current $I_g$ and also control conductor current $I_c$ along a regulating cryotron device, the geometry and operating temperature of said device determining the magnitude of said currents thus supplied. The regulating cryotron is supported on a same substrate so as to be maintained at a same operating temperature as the cryogenic array; also, the regulating cryotron and the cryogenic array are formed of same materials and deposited during a same deposition process such that the respective characteristics are similar. A superconductive strip including a normal segment having a resistance comparable to the normal resistance of the gate conductor in the regulating cryotron is arranged in parallel with the tandem arrangement of the regulating cryotron device and biasing circuits in the cryogenic array.

Currents directed to the parallel arrangement, therefore, divide between the one path including the regulating cryotron device in tandem with the biasing circuits in the cryogenic array and the second path including the normal resistance element in a ratio inversely proportional to the ratio of resistances included therein. During dynamic operation of the cryogenic array, the effective resistance of the regulating cryotron device varies in a same direction as variations in the operating temperature. Accordingly, bias currents $I_b$ supplied to the biasing circuits along the regulating cryotron device vary as an inverse function of operating temperature. For example, with decreasing operating temperatures, the effective resistance of the regulating cryotron device is reduced and the magnitude of biasing currents to the cryogenic array is increased; conversely, with increasing operating temperatures, the effective resistance of the regulating cryotron device is increased and the magnitude of biasing currents to the cryogenic array is reduced.

The foregoing and other objects, features, and advantages of the invention will be apparent from the following more particular description of preferred embodiments of the invention, as illustrated in the accompanying drawings.

Figure 1:
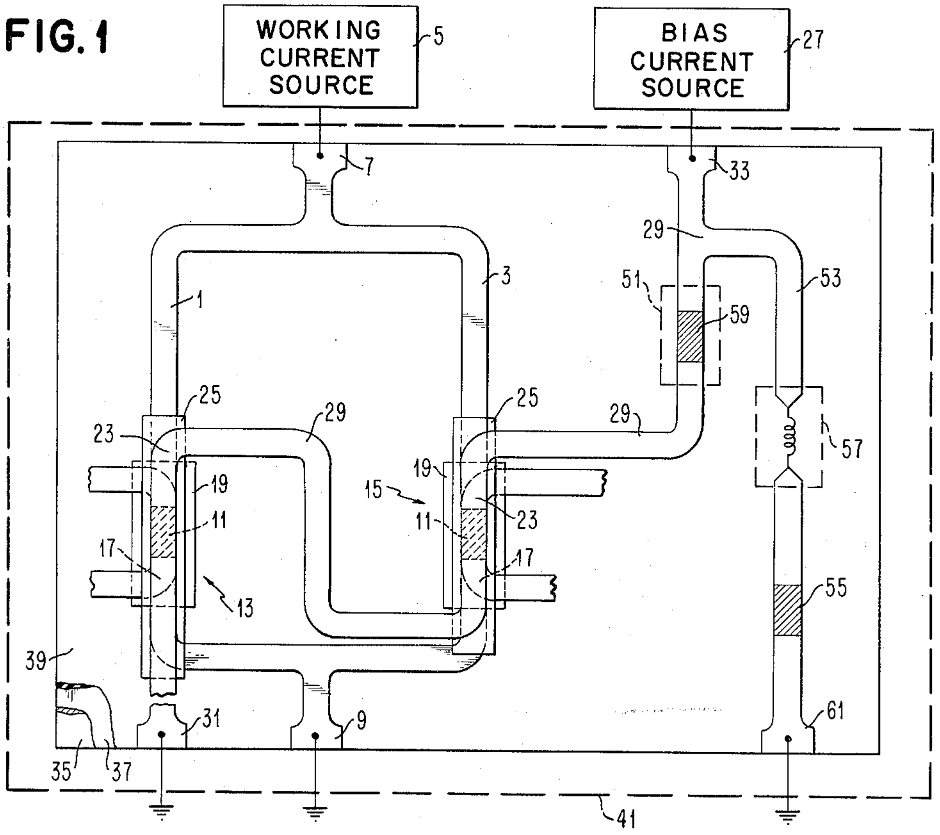
FIG. 1 is an arrangement in accordance with the principles of this invention for regulating operating currents supplied to a cryogenic array.
Figure 5:
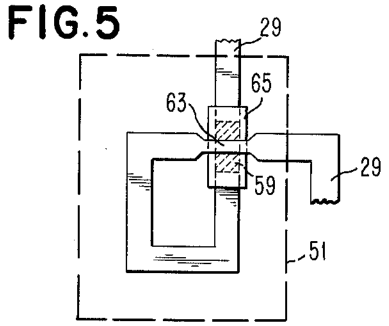
FIGS. 5 and 6 illustrate "cross-over" and "in-line" cryotron arrangements, respectively, which can be employed to regulate operating currents supplied to a cryogenic array in accordance with the principles of this invention.
Figure 6:
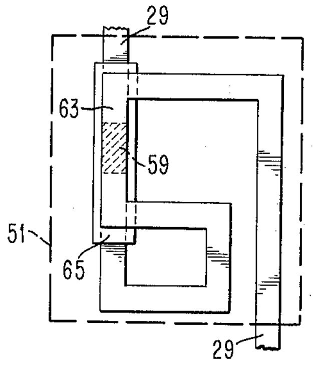
Figures 7, 8:
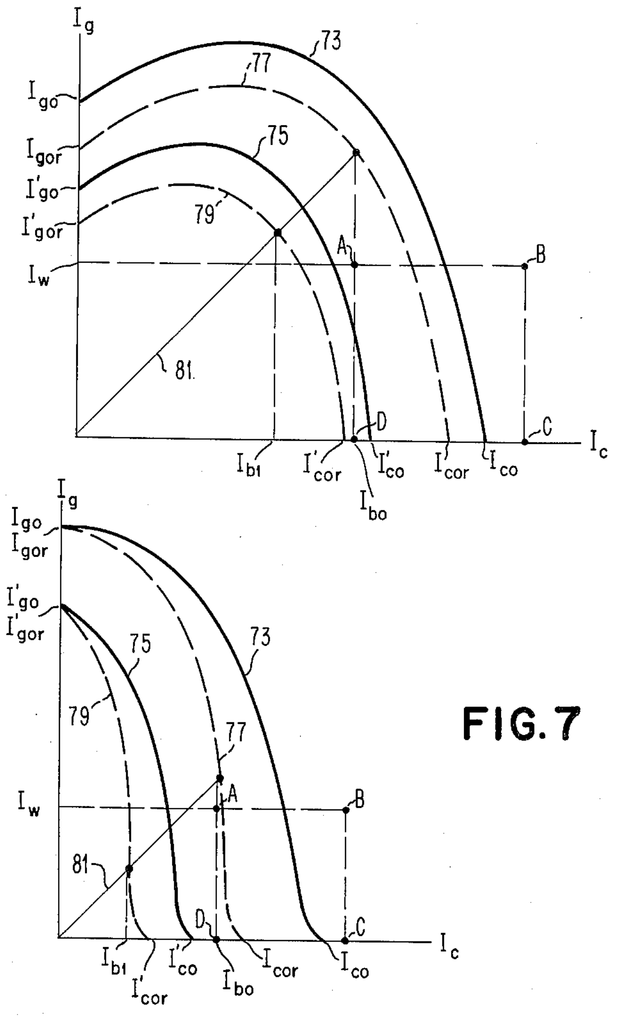

FIGS. 7 and 8 illustrate the characteristic transition curves of the regulating "cross-over" and "in-line" cryotron arrangements of FIGS. 5 and 6, respectively, and also cryotron devices of same type forming the cryogenic array of FIG. 1. Further, these figures illustrate the respective temperature sensitivities of the regulating cryotron arrangements of FIGS. 5 and 6, respectively, and also the corresponding array cryotrons.

An arrangement in accordance with the principles of this invention for regulating biasing currents $I_b$ supplied to a basic cryotron circuit arrangement is illustrated in FIG. 1. The basic arrangement comprises alternate superconductive paths 1 and 3 defining a superconductive loop and connected between a source 5 of gate current $I_g$ and ground at land structures 7 and 9, respectively. Conductors 1 and 3 are formed of hard superconductive material, e.g. lead, except for segments of soft superconductive material, e.g. tin, forming gate conductors 11 of "in-line" cryotrons 13 and 15. In addition, control conductors 17 of hard superconductive material are registered in magnetic field-applying relationship with the gate conductors 11 of cryotrons 13 and 15, respectively. Control conductors 17 are electrically insulated from the associated gate conductors 11 by thin films 19 of dielectric material, e.g. silicon monoxide (SiO). Control conductors 17 are each connected to separate sources of control current $I_c$, not shown. In actual circuit applications, gate current $I_g$ and control current $I_c$ are usually equal in magnitude and are hereinafter identified as the working current $I_w$.

"In-line" cryotrons 13 and 15 each include a bias conductor 23 formed of a hard superconductive material registered with the associated gate and control conductors 11 and 17 and are electrically insulated therefrom by a second dielectric film 25. Bias conductors 23 are connected to a bias current source 27 along a conductor 29 of hard superconductive material and connected in series such that bias currents $I_b$ along each flow in a same direction with respect to the control conductors 17. Conductor 29 is grounded at land 31.

The arrangement hereinabove described is a known "in-line" cryotron arrangement incorporating biasing techniques. The arrangement is formed, for example, by vacuum metalizing techniques onto a glass substrate 35 over which has been deposited a ground plane 37 of hard superconductive material and a thin layer of dielectric material 39. The superconductive materials forming the strip conductors 1 and 3 and also the gate conductors 11, control conductors 17, and bias conductors 23 along with the thin dielectric films 19 and 25 are deposited, in turn, through appropriate masking arrangements. The ground plane 37 serves as a magnetic shield to reduce the inductance in the superconductive loop and also to reduce high field effects along the edges of the individual gate, control, and bias conductors. It is to be understood that numerous cryotron arrangements as illustrated would be deposited in integrated fashion as an array onto substrate 35. Also, the arrangement for regulating biasing current $I_b$ supplied to the cryogenic array, as hereinafter described, is deposited in similar fashion and concurrently with gate conductors 11 and bias conductors 23 onto substrate 35.

The array-supporting substrate 35 along with the cryogenic array supported thereon are normally refrigerated, e.g. by a cryostat 41 containing a liquid helium bath, below the critical transition temperature $T_c$ of the gate conductor material. Accordingly, alternate current paths 1 and 3 and also control conductors 17 and bias conductors 23 are normally superconductive. During the quiescent state, the operating temperature $T_o$ of the cryogenic array is precisely determined at the temperature of the liquid helium bath. During dynamic operation, however, the operating temperature of the cryogenic array is increased due to thermal processes inherent in the switching operation. One such process relates to the latent heat associated with the phase transition of gate conductors 11 between superconductive and resistive phase states. For example, when a gate conductor 11 reverts to the resistive state, a quantity of heat is absorbed from the liquid helium bath in cryostat 41; however, a same quantity of heat is released when the gate conductor reverts to the resistive state. In effect, therefore, the process is thermodynamically reversible and when averaged out over many switching cycles does not vary the operating temperature of the cryogenic array. The second thermal process relates to the omhic heat generated during dynamic operation of the cryogenic array. When a gate conductor 11 is switched resistive, current $I_g$ therealong decays nearly exponentially due to loop inductance and ohmic heating results. In addition, some ohmic heat is generated at this time by eddy currents induced by magnetic fields penetrating the gate conductor 11 while resistive. The ohmic heat, for the most part, is transferred to the array-supporting substrate 35 and must be dissipated in cryostat 41. Substrate 35 forms, in effect, a thermal reservoir which tends, along with other thermal time constants in the system, to maintain the operating temperature of the cryogenic array in excess of the helium bath temperature.

Figure 2:
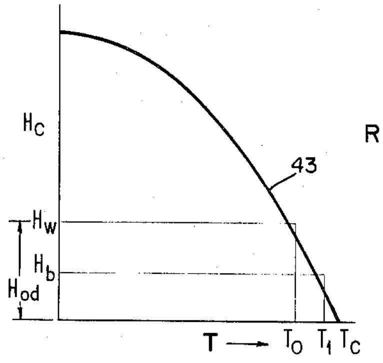
FIG. 2 is a phase diagram of a superconductive specimen wherein critical magnetic fields $H_c$ are plotted as a function of temperature T.

As cryotrons are inherently temperature-sensitive, variations in operating temperatures affect the transition characteristics of such devices. For example, FIG. 2 shows a phase diagram wherein critical magnetic fields $H_c$ of gate conductor 11 are plotted as a function of operating temperature T. As operating temperature T increases from the designed operating temperature $T_o$ toward critical transition temperature $T_c$, the magnitudes of critical magnetic fields $H_c$ required to drive the gate conductor 11 resistive decrease; near the critical transition temperature $T_c$, the slope of phase curve 43 is sufficiently large whereby small variations in operating temperature markedly vary the magnitude of critical magnetic fields $H_c$. In practice, operating temperature $T_o$ is selected near the critical transition temperature $T_c$ to minimize the magnitude of working currents $I_w$ supplied to the cryogenic array to, for example, reduce ohmic heating. Also, FIG. 2 illustrates that the magnitude of biasing magnetic fields $H_b$ generated by a bias conductor 23 and applied to gate conductor 11 are less than critical magnetic fields $H_c$ at the operating temperature $T_o$ and supplement applied switching magnetic fields $H_w$ generated by the associated control conductor 17. The total over-driving magnetic fields $H_{od}$ applied to gate conductor 11, i.e. $H_w+H_b$, are sufficiently in excess of the critical magnetic fields $H_c$ at the operating temperature $T_0$ to accelerate phase transition of gate conductors 11. As operating temperature increases, however, biasing magnetic fields $H_b$, if maintained constant, can exceed the critical magnetic fields $H_c$, e.g. at temperature $T_1$, and singularly drive gate conductors 11 resistive. Such malfunction is avoided by varying the magnitude of biasing magnetic fields $H_b$ applied to the gate conductors 11 as an inverse function of operating temperature while applying a constant magnitude of switching magnetic fields $H_w$ to switch a gate conductor 11. Accordingly, the magnitude of the over-driving magnetic fields $H_{0d}$ varies as a function of operating temperatures and proper operation of the cryogenic array is insured.

Biasing magnetic fields $H_b$ generated within the cryogenic array are conveniently regulated as an inverse function of operating temperature by providing a temperature-sensitive element 51 along conductor 29 and in tandem arrangement with biasing conductors 23; also, a conductor 53 of hard superconductive material and including a normal resistance segment 55, e.g. gold, is deposited in parallel with said tandem arrangement as shown in FIG. 1. The parallel conductor 53 is grounded at land 61. The arrangement of biasing conductors 23 in the cryogenic array is hereinafter referred to as the biasing load L. Inductance 57 along conductor 53 represents inductance of the loop formed by conductors 29 and 53.

Figure 3:
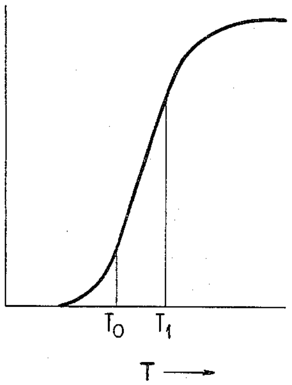
FIGS. 3 and 4 are plots illustrating the transition between superconductive and normal resistance states of superconductive specimens exhibiting broad and sharp transition characteristics, respectively.

In accordance with one aspect of this invention regulating element 51 can be formed of a segment 59 of superconductive material having a critical transition temperature slightly below the designed operating temperature $T_0$ and exhibiting a broad transition between superconductive and normal phase states. The transition characteristics of superconductive segment 59 are shown in FIG. 3 wherein resistance R is plotted as a function of temperature T; expected maximum excursion of the operating temperature due to ohmic heating of the cryogenic array is indicated as $T_1$. Within the temperature range $T_0$–$T_1$, segment 59 is in an intermediate phase state, i.e. neither wholly superconductive nor wholly resistive, and exhibits an effective resistance which increases as a function of temperature. With increasing operating temperatures and the resulting increase in effective resistance of segment 59, less biasing current $I_b$ is supplied to the biasing load L. Conversely, with decreasing operating temperatures, e.g. when the cryogenic array is operating in a less dynamic state, the effective resistance of segment 59 is reduced and more biasing current $I_b$ is supplied to the biasing load L. The magnitude of biasing current $I_b$ supplied to the biasing load L, therefore, varies as an inverse function of operating temperature and is equal to the critical self-current of segment 59 at the particular operating temperature. Since the resistance of normal element 55 is comparable to the normal resistance of segment 59, currents from source 27 divide in a proper ratio between the parallel current path with either increasing or decreasing operating temperatures. If the normal resistance element 55 were not included, current along conductor 53 would continue to flow undiminished with decreasing operating temperatures.

While regulating element 51 has been described with respect to FIG. 1 as a superconductive segment, numerous alternate cryogenic devices can be similarly employed. For example, each of the basic configurations of "cross-over" and "in-line" cryotron devices illustrated in FIGS. 5 and 6, respectively, may be substituted directly for segment 59 in FIG. 1; the idealized switching characteristics of "cross-over" and "in-line" cryotron devices are illustrated and hereinafter discussed with respect to FIGS. 7 and 8, respectively. From the discussion hereinafter set forth, it will be evident to one skilled in the art that the particular configuration and also the geometry of the selected cryotron device determine the range and magnitude of currents $I_b$ supplied to biasing load L.

The "cross-over" cryotron illustrated in FIG. 5 is formed by doubling a section 63 of conductor 29 over upon itself in transverse arrangement with respect to regulating segment 59 to define control and gate conductors, respectively, of a cryotron. Control conductor section 63 and segment 59 are electrically insulating by thin dielectric film 65. The "cross-over" regulating cryotron would preferably be employed with an array formed of similar type devices. As illustrated, the width of the control conductor section 63 is reduced with respect to that of segment 59 so as to exhibit a lower critical current $I_{c0}$ than the control conductor 17 at a same operating temperature to properly determine thet magnitude of currents $I_b$ supplied to the bias load L, as hereinafter described.

Also, the "in-line" cryotron illustrated in FIG. 6 is similarly formed by folding control conductor section 63 over upon itself in parallel, registered arrangement with regulating segment 59; also, control conductor section 63 and regulating element 51 are electrically insulating by a thin dielectric film 65. The "in-line" cryotron arrangement illustrated is operative in an anti-parallel mode; it will be evident, however, that an "in-line" cryotron operative in a parallel mode could be similarly employed. As illustrated, the widths of the control conductor section 63 and segment 59 are equal but reduced with respect to control conductors 17 and gate conductors 11 of array cryotrons 13 and 15. Accordingly, the critical self-current $I_{g0}$ and the critical current $I_{c0}$ of segment 59 and control conductor section 63, respectively, are reduced with respect to those of gate conductors 11 and control conductors 17 of array cryotrons 13 and 15, respectively, at a same operating temperature. This geometry of the regulating cryotron properly determines the magnitude of currents $I_b$ supplied to the biasing load L.

In practicing this invention, it is preferred, but not required, that the regulating cryotron device and cryotron devices forming the cryogenic array be of a same type. For example, if the cryogenic array of FIG. 1 includes "cross-over" cryotrons, the "cross-over" cryotron arrangement of FIG. 5 would be substituted as the regulating element 51. Also, regulating element 59 forming the gate conductors of the regulating cryotron devices of FIGS. 5 and 6, respectively, are formed of a same superconductive material as are gate conductors 11 in the cryogenic array. For maximum efficiency, regulating segment 59 and gate conductors 11 are deposited during a same deposition process, so as to exhibit identical characteristics. It is known that slight variations in system parameters during a deposition process affect the characteristics of a depositant formed on a substrate. Accordingly, by concurrent deposition, variations in the system parameters are reflected in the respective characteristics of gate conductors 11 and segment 59 to a same extent.

Since the operation of the "cross-over" and "in-line" cryotron devices illustrated in FIGS. 5 and 6, respectively, when substituted for the regulating element 51 of FIG. 1 are substantially similar, the operations of each will be described concurrently with respect to the characteristic curves illustrated in FIGS. 7 and 8, respectively; the regulating cryotron device and cryotrons forming the cryogenic array in each embodiment are assumed to be of identical type. References are made concurrently to FIGS. 7 and 8 when describing common subject matter and same designations are employed to identify corresponding parameters.

In each of FIGS. 7 and 8, gate conductor current $I_g$ and the control conductor current $I_c$ of the array cryotrons and the regulating cryotron, respectively, are plotted along the ordinate and the abscissa, respectively. Currents $I_{g0}$ and $I_{g0r}$ identify critical self-currents of gate conductors 11 and regulating segment 59, respectively, at the designed operating temperature $T_0$; also, currents $I_{c0}$ and $I_{c0r}$ identify critical currents of control conductor 17 and control conductor section 63, respectively. More particularly, current $I_{c0}$ identifies total currents $I_c$ and $I_b$ directed along the control and bias conductor 17 and 23, respectively, required to apply magnetic fields in excess of the critical magnetic fields $H_c$ to switch the associated gate conductor 11 in the absence of current therealong. The transition characteristics or phase diagrams illustrated in FIGS. 7 and 8, respectively, though idealized, are well known in the art. Loci defined by predetermined magnitudes of gate current $I_g$ and control current $I_c$ and located within, without, or along a curve correspond to operating states wherein the gate conductor element of the cryotron device is in a totally superconductive phase, a totally resistive phase, or an intermediate phase, i.e neither totally superconductive nor totally resistive, respectively.

The characteristic curves at operating temperature $T_0$ of "cross-over" and "in-line" cryotrons arranged in an array, e.g. as shown in FIG. 1, are represented by the solid curve 73 in FIGS. 7 and 8, respectively. During dynamic operation, the operating temperature of the cryogenic array is increased to a maximum temperature $T_1$, as herinabove described. As critical self-current of gate conductor 11 and critical current of control conductor 17 vary as an inverse function of temperature, the transition characteristics of the array cryotron vary continuously and, at a maximum temperature excursion $T_1$, are represented by solid curve 75. At operating temperature $T_1$, the critical self-current of gate conductor 11 and the critical current of control conductor 17 of the array cryotron are identified as $I'_{g0}$ and $I'_{c0}$, respectively.

In FIGS. 7 and 8, the transition characteristic curves of "cross-over" and "in-line" regulating cryotrons shown in FIGS. 5 and 6, respectively, at operating temperature $T_0$ and $T_1$ are represented by the dashed curves 77 and 79, respectively. With respect to the "cross-over" cryotron of FIG. 5, and referring particularly to the representations of FIG. 7, regulating segment 59 is formed of a same superconductive material and can have similar dimensions as the gate conductors 11. Accordingly, in this case, critical self-current of regulating segment 59 and the critical self-current of gate conductors 11 are equal at a same operating temperature, i.e. critical self-currents $I_{g0}$ and $I_{g0r}$ and also $I'_{g0}$ and $I'_{g0r}$ are equal at operating temperatures $T_0$ and $T_1$, respectively. On the other hand, magnitude of the critical control current $I_{c0r}$ along section 63 is determined by the width of section 63 which is selected such that current $I_{c0r}$ is less than the critical control current $I_{c0}$ of the control conductor 17. Also, as the transition characteristics of the "cross-over" regulating cryotron vary continuously with temperature, this relationship is retained at the maximum temperature excursion $T_1$, i.e., $I'_{c0r}$ is less than $I'_{c0}$. The transition characteristics of the "cross-over" regulating cryotron at operating temperature $T_1$ are represented by the dashed curve 79 in FIG. 7. Deviations in the transition characteristic curves 77 and 79 of the "cross-over" regulating cryotron with respect to curves 73 and 75, respectively, of an array cryotron are precisely controlled by geometry, i.e. the difference in width between control conductor section 63 and control conductors 17.

As the critical control current $I_c$ and critical self-current $I_g$ in "in-line" cryotron devices are size dependent, similar effects are achieved with respect to the regulating cryotron of FIG. 6; however, it is preferable to scale down the dimensions of both the regulating segment 59 and the control conductor section 63. The result of the reduced geometry of the "in-line" regulating cryotron of FIG. 6 with respect to the array cryotrons is shown by comparison of curves 77 and 79 which represent the transition characteristic curves of an "in-line" regulating cryotron at operating temperatures $T_0$ and $T_1$, respectively, with curves 73 and 75 of the array cryotron.

As same currents flow along both regulating segment 59 and control conductor 63, the operation of a regulating cryotron as shown in FIG. 5 or 6 is necessarily defined at the intersection of an operating line 81 drawn from the origin and having a unity slope with the transition characteristic curve, e.g. either 77 or 79, corresponding to a particular operating temperature. In effect, therefore, currents $I_c$ and $I_g$ directed along the regulating segment 59 and control conductor section 63, respectively, each reduce sufficiently to maintain segment 59 in an intermediate phase state. The magnitude of currents directed from bias source 27 is such that, considering the presence of the parallel conductor 53 and resistance element 55, the segment 59 is not driven totally resistive. The magnitude of currents along a regulating cryotron, therefore, is determined as a function of the present operating temperature and also the particular geometry of the regulating cryotron type. As temperature varies between $T_0$ and $T_1$, the sensitivity of the regulating cryotron causes the magnitude of biasing currents $I_b$ directed to the biasing load L to vary continuously as a function of the operating temperature between the magnitudes $I_{b0}$ and $I_{b1}$.

Figure 4:
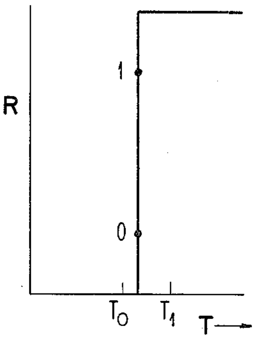

As hereinafter described, the operating characteristics of the regulating cryotron and the array cryotrons as determined by the respective geometries differ in that, at a particular operating temperature, maximum currents along the regulating cryotron do not exceed the control current $I_c$ of the array cryotrons as influenced by the working current. Moreover, the magnitude of biasing currents $I_b$ supplied to the biasing load L are controlled by the regulating cryotron as an inverse function of operating temperature. For example, the operation, i.e. the effective resistance, of regulating segment 59, since it is in an intermediate phase state, can be represented along the vertical portion of the transition plot of FIG. 4. At operating temperature $T_0$, currents $I_{b0}$ are supplied to biasing load L along the regulating cryotron, see FIGS. 7 and 8, and the effective resistance of regulating segment 59 is represented at point 0 of the transition plot of FIG. 4. As the operating temperatures increase from $T_0$ to $T_1$, reduced currents $I_{b1}$ are supplied to the biasing load L and effective resistance of regulating segment 59 is, in effect, increased whereby the effective resistance is represented by a point 1 of the transition plot of FIG. 4. It is evident that the effective resistance of the regulating segment 59 varies continuously within the expected range of operating temperature $T_0$ and $T_1$ between the points 0 and 1. The range over which control can be obtained is increased as the resistance of element 55 is decreased.

Accordingly, during quiescent operation, the entire working currents $I_w$ from source 5 and applied at land 7 are directed along one of the superconductive paths, e.g. path 3 and along gate conductor 11 included therein; no working currents flow along the superconductive path 1. At the designed operating temperature $T_0$, biasing currents $I_{b0}$ are directed along the regulating cryotron and supplied to biasing load L. At this time, the operation of array cryotron 15 is defined at point A and that of array cryotron 13 at point D, hereinafter described.

When current is to be switched from path 3 to path 1, switching currents of a magnitude equal to that of working currents $I_w$ are directed along control conductor 17 which supplement biasing currents $I_{b0}$ to define the operation of cryotron 15 at point B located beyond curves 73, respectively, in FIGS. 7 and 8, respectively. When the operation of the array cryotron 15 passes beyond curve 73, gate conductor 11 reverts to a resistive state and current is forced along the alternate path 1. As current along path 3 decreases, the operation of cryotron 15 moves downwardly from point B to point C, the latter point defining that operation wherein the entire current has been switched from path 3 to path 1. While working currents $I_w$ are supplied to the control conductor 17, the operation of cryotron 15 remains at point C and gate conductor 11 continues resistive. When working currents $I_w$ are discontinued, the operation of cryotron 15 moves along the abscissa from point C to point D. The switching operations of an array cryotron, therefore, when biasing techniques are employed, are represented by the rectangular path ABCD.

As illustrated in FIG. 2, it is essential that the magnitude of biasing currents $I_b$ as controlled by the regulating cryotron should not exceed that magnitude of control currents $I_c$, as modified by working currents $I_w$, i.e. gate currents $I_g$, necessary to drive a gate conductor 11 resistive at any particular operating temperature. It is to be appreciated that a bias conductor 23 is, in effect, a second control conductor with respect to the associated gate conductor 11. As shown in FIGS. 7 and 8, the operation of an array cryotron, if bias currents are maintained constant, for example, at a level $I_{b0}$, would be defined without the characteristic curve 75 when operating temperature is increased from $T_0$ to $T_1$. Bias currents $I_{b0}$ suitable for operation at temperature $T_0$ would be singularly sufficient to drive gate conductor 11 of the array cryotron resistive when operating temperature is increased to $T_1$ and while working currents $I_w$ are supplied therealong. In accordance with the principles of this invention, however, due to geometric differences of the regulating cryotrons, bias currents $I_b$ supplied to biasing load L are reduced with respect to and "track" critical currents $I_c$ along control conductors 17 as modified by working currents $I_w$ along the associated gate conductors 11. Accordingly, the operation of the array cryotrons are necessarily defined within superconductive regions of the curves 73 and 75 within the expected range of operating temperatures $T_0$–$T_1$ of the system and malfunctions are avoided.

While the invention has been particularly shown and described with reference to preferred embodiments thereof, it will be understood by those skilled in the art that various changes in form and details may be made therein without departing from the spirit and scope of the invention.

What is claimed is:

1. In a system for regulating operating currents supplied to a cryogenic array comprising, in combination, a source of operating currents, a cryogenic array to which said operating currents are to be supplied, temperature-responsive means exhibiting a resistance which varies with temperature and connecting said source to said cryogenic array, and a current path exhibiting a fixed resistance and connected in parallel with the tandem arrangement of said temperature-responsive means and said cryogenic array, current dividing between said tandem arrangement and said parallel current path in a ratio inversely proportional to the ratio of resistance included in each.

2. In a system as defined in claim 1 wherein said temperature-responsive means is formed of superconductive material having transition characteristics such as to be in an intermediate phase state within expected maximum and minimum excursions of operating temperature.

3. In a system as defined in claim 2 wherein said cryogenic array and said temperature-responsive means are supported on a same substrate so as to be maintained at substantially a same operating temperature, and means for establishing said cryogenic array at a predetermined operating temperature.

4. In a cryogenic system, a cryogenic array comprising a plurality of cryotron devices each including a biasing conductor, means for establishing said array at a predetermined operating temperature, means for supplying biasing currents to said biasing conductors, a first superconductive path connected to said supplying means and in tandem arrangement with said biasing conductors in said array, said first path being formed of superconductive material and exhibiting an effective resistance which varies as a function of temperature, and a second path in parallel arrangement with said first path and exhibiting a fixed normal resistance, currents from said source dividing between said first and said second paths in a ratio inversely proportional to the ratio of said effective resistance and said fixed resistance.

5. In a cryogenic system, a cryogenic array comprising a plurality of cryotrons each including at least a bias and a control conductor of hard superconductive material and a gate conductor of soft superconductive material, said bias and control conductors being arranged in magnetic field applying relationship to said gate conductor, a source of bias current, means for applying said bias currents along each of said bias conductors, said applying means being formed of a hard superconductive material and including therein a segment of soft superconductive material, a current path in parallel arrangement with said segment of said soft superconductive material and said bias conductors, said current path exhibiting a fixed normal resistance, and means for establishing said cryogenic array and said segment of soft superconductive material at a predetermined operating temperature.

6. In a cryogenic system as defined in claim 5 wherein the fixed normal resistance of said current path is comparable to the normal resistance of said segment of soft superconductive material.

7. In a cryogenic system as defined in claim 5 wherein said segment of soft superconductive material exhibits transition characteristics such as to be in an intermediate phase state at said predetermined operating temperature.

8. In a cryogenic system as defined in claim 5 wherein said gate conductors and said segment are formed of a same soft superconductive material.

9. In a cryogenic system as defined in claim 5 wherein a section of said applying means is folded over upon said segment of soft superconductive material in transverse magnetic field-applying relationship therewith, said section and said segment forming, in effect, the control and gate conductors, respectively, of a "cross-over" cryotron.

10. In a system as defined in claim 9 wherein the width of said section of said applying means is less than the width of said segment of soft superconductive material.

11. In a cryogenic system as defined in claim 5 wherein a section of said applying means is folded over upon said segment of soft superconductive material in parallel, magnetic field-applying relationship therewith, said section and said segment forming, in effect, the control and gate conductors of an "in-line" cryotron.

12. In a cryogenic system as defined in claim 11 wherein each of said array cryotrons are of the "in-line" type, and the width of said segment of soft superconductive material and said section of said connecting means, respectively, are equal and less than the widths of said conductors in said array cryotrons.

13. A cryogenic system wherein operating currents supplied to a cryogenic load are regulated as a function of operating temperature comprising means for establishing said system at a predetermined operating temperature, a cryogenic load, regulating means including a segment of a first superconductive material which exhibits a transition between superconductive and normal phase states substantially at said predetermined operating temperature, means connecting said regulating means in series arrangement with said cryogenic load, a current path in parallel arrangement with said series arrangement, and means for directing operating currents to said parallel arrangement, variations in effective resistance of said regulating means due to variations in operating temperatures being effective to vary the magnitude of said operating currents directed to said cryogenic load.

14. In a system as defined in claim 13 wherein said connecting means includes a section of a second superconductive material arranged in magnetic field-applying relationship with said segment of first superconductive material to form, in effect, the control and gate conductors, respectively, of a regulating cryotron device, the critical transition temperature of said second superconductive material being larger than that of said first superconductive material.

15. In a system as defined in claim 14 wherein said cryogenic load comprises an arrangement of bias conductors associated one with each of a plurality of cryotron devices arranged in an array, the respective geometries of said regulating cryotron device and said array cryotron devices being determined such that the critical current $I_{c0}$ of said control conductor of said regulating cryotron device is less than that of the control conductors in each of said array cryotron devices.

16. In a system as defined in claim 14 wherein said section of second superconductor material is arranged in transverse relationship with said segment of first superconductive material.

17. In a system as defined in claim 14 wherein said section of second superconductor material is arranged in parallel, registered relationship with said segment of first superconductive material.

18. A cryogenic system wherein operating currents supplied to a cryogenic load are regulated as a function of operating temperature, comprising, a cryogenic load, a first current path connected in tandem arrangement with said cryogenic load, a second current path connected in parallel arrangement with said first current path and said cryogenic load, and a source of operating currents connected to said first and said second current paths, one of said current paths including superconductive means exhibiting transition characteristics such as to be in an intermediate phase state within the expected range of variations in said operating temperature, the other of said current paths exhibiting a predetermined normal resistance.

19. A cryogenic system wherein operating currents supplied to a cryogenic load are regulated as a function of operating temperature, comprising, a cryogenic load, a first current path connected in tandem arrangement with said cryogenic load, a second current path connected in parallel arrangement with said first current path and said cryogenic load, a source of operating currents connected to said first and said second current paths, one of said current paths including superconductive means exhibiting transition characteristics such as to be in an intermediate phase state within the expected range of variations in said operating temperature, the other of said current paths exhibiting a predetermined normal resistance and additional means for applying magnetic fields of controlled direction and magnitude to said superconductive means.

References Cited by the Examiner

UNITED STATES PATENTS

| | | | |
|---|---|---|---|
| 2,691,889 | 10/54 | Dion | 73—342 |
| 2,777,640 | 1/57 | Kaufman | 328—3 X |

OTHER REFERENCES

Anderson et al.: IBM Technical Disclosure Bulletin, vol. 3, No. 11, April 1961.

JOHN W. HUCKERT, *Primary Examiner.*

ARTHUR GAUSS, *Examiner.*